(12) United States Patent
Zhou et al.

(10) Patent No.: US 10,328,504 B2
(45) Date of Patent: Jun. 25, 2019

(54) TWO-STAGE METHOD OF CUTTING ULTRA-HIGH STRENGTH MATERIAL SHEET

(71) Applicants: Dajun Zhou, Troy, MI (US); Changqing Du, Troy, MI (US); Robert D Miller, Lake Orion, MI (US)

(72) Inventors: Dajun Zhou, Troy, MI (US); Changqing Du, Troy, MI (US); Robert D Miller, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 182 days.

(21) Appl. No.: 15/367,298

(22) Filed: Dec. 2, 2016

(65) Prior Publication Data
US 2018/0154420 A1 Jun. 7, 2018

(51) Int. Cl.
*B23D 35/00* (2006.01)
*B21D 28/26* (2006.01)
*B23D 31/00* (2006.01)

(52) U.S. Cl.
CPC .......... *B23D 35/001* (2013.01); *B21D 28/26* (2013.01); *B23D 31/00* (2013.01); *Y10T 83/942* (2015.04); *Y10T 83/9432* (2015.04)

(58) Field of Classification Search
CPC ............ Y10T 83/0529; Y10T 83/4577; Y10T 83/9416; Y10T 83/9418; Y10T 83/942;
(Continued)

(56) References Cited

U.S. PATENT DOCUMENTS 516,735 A * 3/1894 Hammond ................ B26F 1/36
83/468.9
2,386,147 A * 10/1945 Sidebotham ........... A41B 3/005
83/255
(Continued)

FOREIGN PATENT DOCUMENTS

CA 2466688 A1 * 10/2005 ............. B21D 35/00
DE 1660033 A1 * 12/1970 ................ B26F 1/14
(Continued)

OTHER PUBLICATIONS

Eistle, Martin, et al.; "Determining the influence of shear cutting parameters on the edge cracking susceptibility of high-strength-steels using the edge-fracture-tensile-test"; Institute of Metal Forming and Casting; 2015; Germany.
(Continued)

*Primary Examiner* — Sean M Michalski
(74) *Attorney, Agent, or Firm* — Ralph E. Smith

(57) ABSTRACT

In a first stage or operation, at least one shear initiation breakthrough opening is formed through the ultra-high strength material sheet at an interior location. A leading terminal end of each of at least two inclined shearing edges of an interior opening shearing tool is positioned in the at least one shear initiation breakthrough opening. The interior opening shearing tool is different from the breakthrough opening forming tool. In a second stage or operation, shearing of the material is initiated from the at least one shear initiation breakthrough opening by advancing the at least two inclined shearing edges of the interior opening shearing tool against the ultra-high strength material sheet and relative to a corresponding shearing tool.

7 Claims, 4 Drawing Sheets

(58) Field of Classification Search
CPC .... Y10T 83/9423; Y10T 83/9432; B26F 1/14; B21D 28/24; B21D 28/243; B21D 28/246; B21D 28/26; B21D 28/265; B21D 35/00; B21D 35/001; B23D 35/001
See application file for complete search history.

(56) References Cited

U.S. PATENT DOCUMENTS

| | | | | |
|---|---|---|---|---|
| 3,974,728 | A * | 8/1976 | Herlan | B21D 28/34 83/686 |
| 5,044,237 | A * | 9/1991 | Frame | B21D 28/22 29/598 |
| 5,099,671 | A * | 3/1992 | Beaulac | B21D 5/042 72/294 |
| 5,915,750 | A * | 6/1999 | Usher | H02K 1/165 29/564.1 |
| 7,998,289 | B2 | 8/2011 | Brodt et al. | |
| 2001/0042430 | A1* | 11/2001 | Negishi | B26F 1/14 83/689 |
| 2002/0029474 | A1* | 3/2002 | Mitsukawa | B21D 28/28 29/890.03 |
| 2003/0075034 | A1* | 4/2003 | Brenneke | B21D 28/34 83/684 |
| 2004/0074356 | A1* | 4/2004 | Abnet | B21D 28/06 83/55 |
| 2006/0156890 | A1* | 7/2006 | Lee | B22F 7/06 83/651 |
| 2015/0093592 | A1 | 4/2015 | Smith | |

FOREIGN PATENT DOCUMENTS

| | | | | |
|---|---|---|---|---|
| DE | 2907415 A1 | * | 9/1980 | B21D 28/24 |
| GB | 140201 A | * | 3/1920 | B26F 1/14 |
| GB | 369747 A | * | 3/1932 | B21D 28/24 |
| WO | WO2014092273 A1 | | 6/2014 | |

OTHER PUBLICATIONS

Feistle, Martin; "Edge-fracture-tensile-test"; Institute of Metal Forming and Casting; Oct. 12-15, 2015; Germany.

* cited by examiner

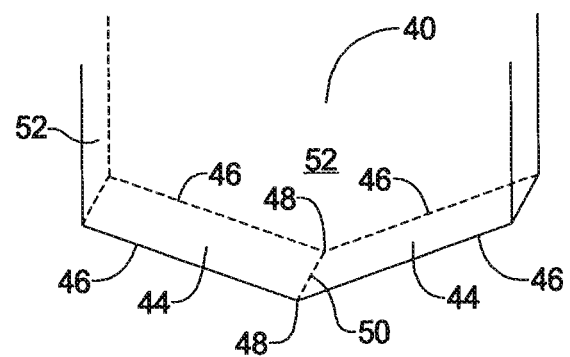
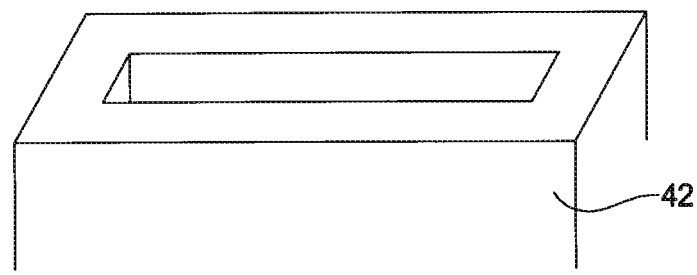
FIG 4
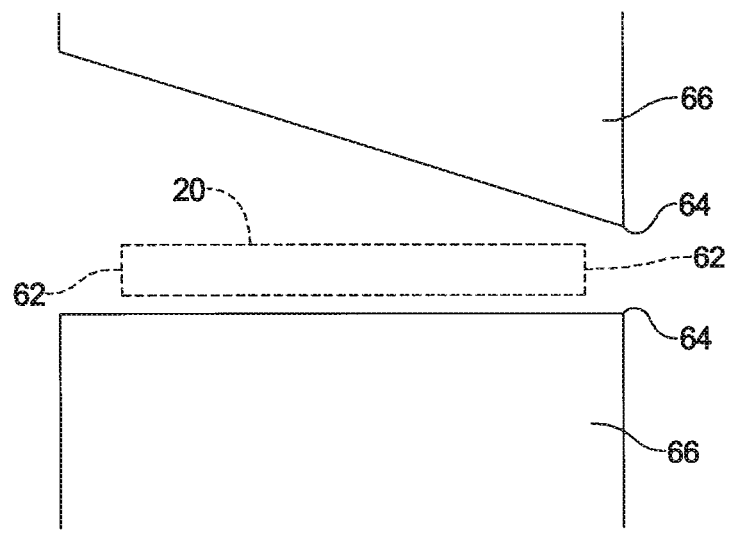
FIG 5

TWO-STAGE METHOD OF CUTTING ULTRA-HIGH STRENGTH MATERIAL SHEET

FIELD

The present disclosure relates to methods of cutting an interior opening in an ultra-high strength material sheet, such as ultra-high strength steel sheets.

BACKGROUND

The automotive industry is increasingly using ultra-high strength material sheets to increase structural strength and deliver increased safety, or to reduce weight and deliver improved fuel economy, or both. Ultra-high strength steels currently typically have a tensile strength from about 800 MPa to about 1200 MPa. Research is ongoing, however, to develop and produce ultra-high strength steels with tensile strengths of 1500 MPa, 1800 MPa, and even higher. The higher the tensile strength of a material, the more difficulties and problems occur with cutting the material.

When attempting to cut or shear an interior opening in an ultra-high strength material sheet using a traditional process, the cutting tool must initially break through the material. Such a breakthrough operation requires generating a very high peak blanking or cutting force. At the moment of breakthrough, there is a significant, virtually instantaneous drop in the blanking or cutting force. Thus, a loud noise, perhaps at 105 dB or greater, accompanies the moment of breakthrough. In addition, a significant vibration passes through the building, feeling somewhat like an earthquake. Such loud sounds and large vibrations can be very problematic to workers, machines, as well as tools and dies, in manufacturing facilities; particularly when there are fast cycle times. Just as problematic is the wear and tear on the manufacturing machines that are repeatedly subjected to these significant, virtually instantaneous drops in the blanking or cutting force.

Another disadvantage relates to the leading edge of the cutting tool that is engaged against the ultra-high strength sheet during the initial breakthrough operation. Such tools typically involve two angled surfaces coming together at a point, similar to a roof or V-shaped configuration used for balancing induced horizontal surfaces. Thus, such tools typically define two cutting or shearing edges on opposite sides of the angled surfaces that each has a V-shaped configuration with the apex of the V-shape providing the initial or leading contact point or edge along with a pointed roof line extending between them. When cutting ultra-high strength material sheets, these tools wear prematurely at the leading contact points or leading terminal ends. For example, the three-sided corners at the apex of each V-shaped side are often subject to balling, chipping or cracking, long before the useful life of the remainder of the shearing edges have worn down. This premature failure of these tools is problematic because shearing tools capable of cutting ultra-high strength material sheets are expensive to manufacture and purchase.

The present disclosure provides a two-stage method of cutting an interior opening in ultra-high strength material sheets, such as ultra-high strength steel sheets, that solves both the highly localized premature tool failure issues and the operational issues associated with high breakthrough forces.

SUMMARY

In accordance with one aspect of the present disclosure, a two-stage method of cutting an interior opening in ultra-high strength material sheet includes forming at least one shear initiation breakthrough opening through the ultra-high strength material sheet at an interior location. Each shear initiation breakthrough opening is formed with a shear initiation breakthrough opening forming tool. The interior opening shearing tool is different from the shear initiation breakthrough opening forming tool. A leading terminal end of each of at least two inclined shearing edges of an interior opening shearing tool is positioned in the at least one shear initiation breakthrough opening. After the above positioning, shearing of the material is initiated from the at least one shear initiation breakthrough opening by advancing the at least two inclined shearing edges of the interior opening shearing tool against the ultra-high strength material sheet and relative to a corresponding shearing tool.

In accordance with another aspect of the present disclosure, forming the at least one shear initiation breakthrough opening comprises forming at least two shear initiation breakthrough openings, each with a round metal punch.

In accordance with another aspect of the present disclosure, forming the at least one shear initiation breakthrough opening comprises forming each shear initiation breakthrough opening with a diameter that is between about 5 times and about 10 times the thickness of the ultra-high strength material sheet.

In accordance with another aspect of the present disclosure, the interior opening shearing tool comprises two surfaces inclined relative to each other in a V-shaped configuration. In addition, the at least two inclined shearing edges comprises two pairs of inclined shearing edges. Each pair of inclined shearing edges is defined by opposite side edges of one of the two surfaces. The shearing comprises simultaneously advancing the two surfaces to initiate shearing in opposite directions from the at least one shear initiation breakthrough opening.

In accordance with another aspect of the present disclosure, the positioning comprises moving the at least one shear initiation breakthrough opening of the material sheet from an shear initiation breakthrough opening forming stage of a machine, in which the forming occurs, to a shearing stage of the machine, in which the shearing occurs.

In accordance with other aspects of the present disclosure, In accordance with another aspect of the disclosure, the method comprises cutting an ultra-high strength steel sheet, and the ultra-high strength material sheet has a tensile strength of any of about 800 MPa or greater, about 1500 MPa or greater, and about 1800 MPa or greater.

DRAWINGS

The present invention will become more fully understood from the detailed description and the accompanying drawings.

FIG. 4 is a perspective view of an interior opening sheering tool and die of the interior opening shearing stage of FIG. 1.

FIG. 5 is an end elevation view of the cooperating shearing tools of the blanking stage of FIG. 1.

DETAILED DESCRIPTION

Figure 1:
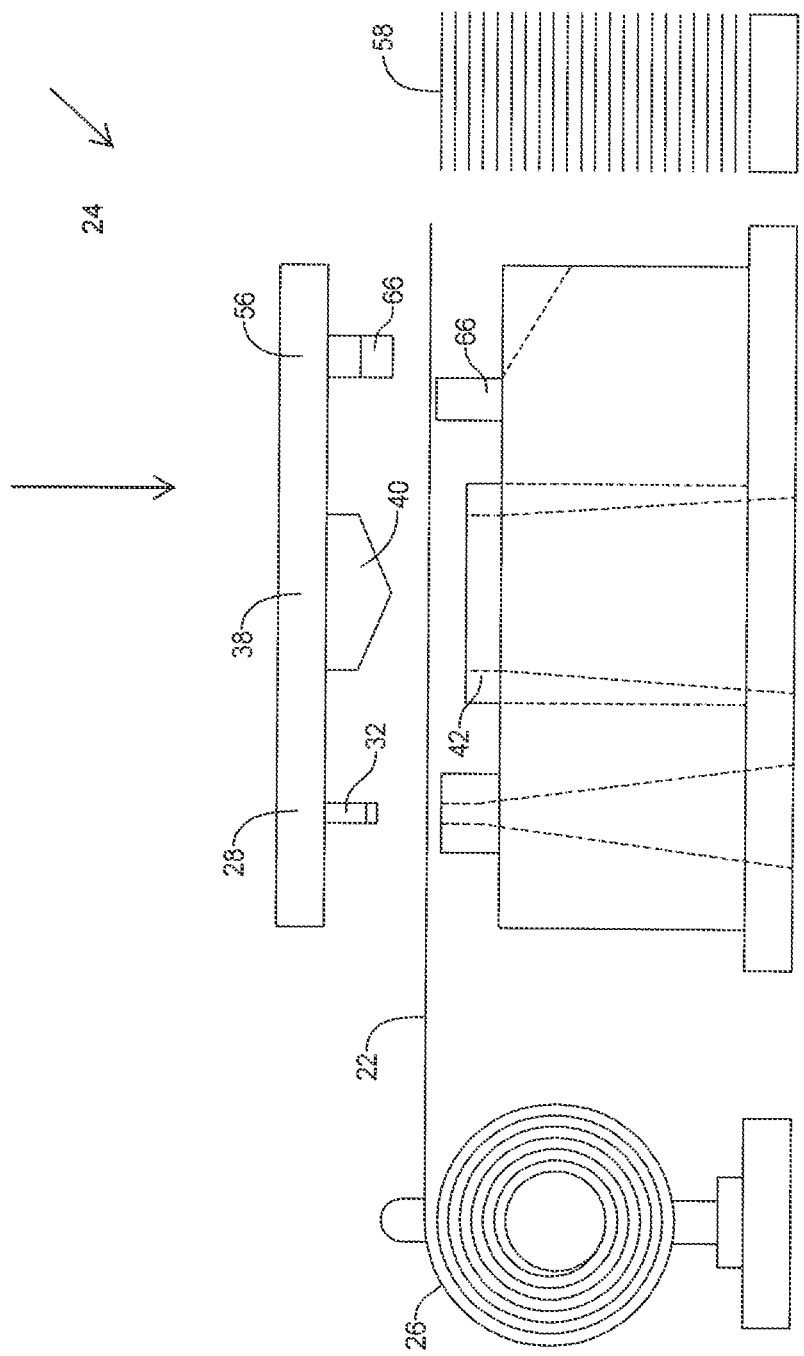
FIG. 1 is a side elevation view of one example of a machine capable of performing one exemplary two-stage method of cutting an interior opening in an ultra-high strength material sheet in accordance with the present disclosure.
Figure 2:
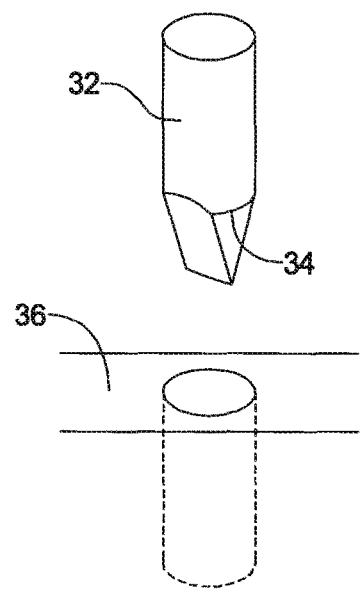
FIG. 2 is a perspective view of a breakthrough initiation opening forming tool and die of the shear initiation breakthrough opening forming stage of FIG. 1.

Further areas of applicability will become apparent from the description, claims and drawings, wherein like reference numerals refer to like features throughout the several views of the drawings. It should be understood that the detailed description, including disclosed embodiments and drawings referenced therein are merely exemplary in nature, intended for purposes of illustration only, and are not intended to limit the scope of the present disclosure.

FIGS. 1-5 illustrate one example two-stage method of cutting an interior opening in ultra-high strength material sheet 22 in accordance with the present disclosure. Ultra-high strength material sheet 22 is supplied to a metal forming and cutting machine 24 from a source 26, which is illustrated in this example as an ultra-high strength coil source 26. Alternatively, the source 26 is a stack of cut ultra-high strength sheet panels. In this example, the ultra-high strength material sheet 22 is an ultra-high strength steel sheet having a tensile strength of about 800 MPa or more. Alternatively, the ultra-high strength material sheet 22 is an ultra-high strength steel sheet having a tensile strength of about 1200 MPa or more, or of about 1500 MPa or more, or even 1800 MPa or more.

The machine 24 is illustrated as a progressive die machine. Alternatively, the machine can be a series of individual line die presses, or a roll forming machine. The machine 24 has a shear initiation breakthrough opening forming stage 28. At this stage 28, a pair of shear initiation breakthrough openings 30 is formed through the ultra-high strength material sheet 22 at an interior location of the sheet 24. In other words, the location is spaced from any exterior edge 62 or interior edge of the sheet. Each of the shear initiation breakthrough openings 30 is formed with a breakthrough opening forming tool 32. The breakthrough opening forming tool 32 is illustrated in this example as a round metal punch 32 with a roof or V-shaped initiation end 34 and corresponding die 36. Such a metal punch 32 is made of an expensive material, such as powder metallurgy materials and is made using expensive high precision grinding methods. Thus, such a metal punch 32 is capable of withstanding the rigors of repeatedly creating breakthrough openings 30 in an interior of the ultra-high strength sheet 22. Alternatively, the metal punch 32 is formed of relatively inexpensive materials and processes, such that the punches 32 are sacrificial punches that are cost-effectively replaced when they wear.

Figure 3:
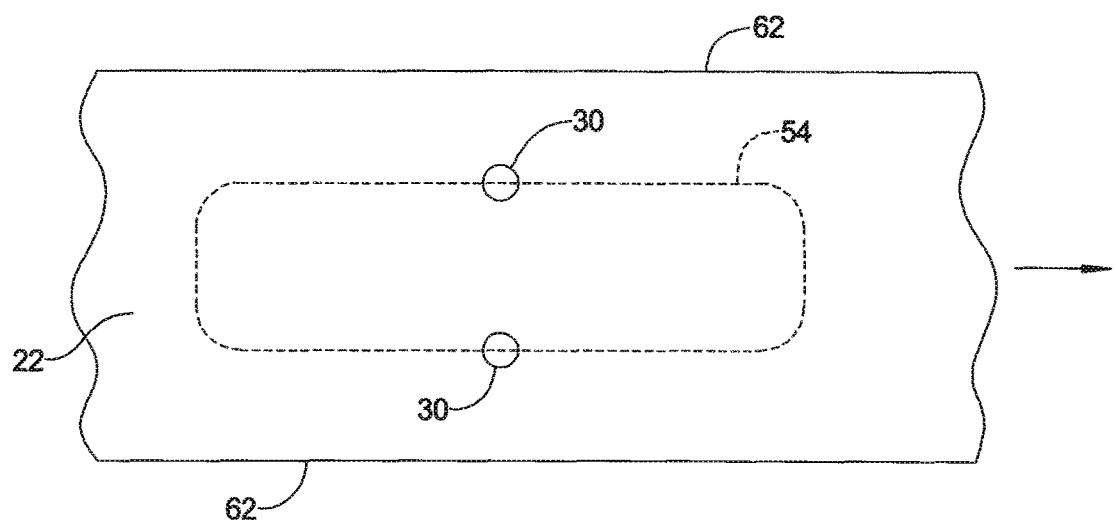
FIG. 3 is a top plan view of a portion of the ultra-high strength material sheet with the breakthrough openings formed therein, and showing the ultimate interior opening in dotted line.

In order to reduce the peak force necessary to drive the metal punch 32 through the ultra-high strength material sheet 22 and create the breakthrough opening 30, the size of the metal punch 32, and therefore the size of the breakthrough opening 30 formed thereby, is relatively small. In the example of FIG. 3, the diameter of each of the two round metal punches 32 is from about 5 times to about 10 times the thickness of the material sheet 22. In the illustrated example machine 24, the two breakthrough openings 30 are simultaneously formed by two corresponding metal punches 32 and die 34 in a single stage shear initiation breakthrough opening forming stage 28.

Alternatively, such as where the ultra-high strength material sheet 22 is relatively thick, each of the two breakthrough openings 30 is separately formed. For example, each breakthrough opening 30 is separately formed in one stage of a two stage shear initiation opening forming stage 28 of the machine 24. Since the overall perimeter of the opening 30 that is being formed at one time is reduced by half, the peak breakthrough force that is required to form the openings 30 is reduced by half.

After the breakthrough openings 30 are formed, the sheet material 22 is advanced one stage within the machine 24. Thus, the breakthrough openings 30 are repositioned from the breakthrough opening forming stage 28 into an interior opening shearing stage 38. At this stage 38, an interior opening sheering tool 40 and corresponding shearing die 42 are provided. The interior opening shearing tool 40 has two surfaces 44 inclined relative to each other in a V-shaped configuration. Each surface 44 has a pair of shearing edges 46 defined by edges 46 of opposite sides 52 of one of the surfaces 44. Each shearing edge 46 has a leading terminal end 48, which in the illustrated example is where the shearing edges 46 of the two inclined surfaces 44 come together at a leading terminal apex or point 48 on each side 52. A leading edge 50 or rooftop between the inclined surfaces 44 also comes together at the apex or point 48.

When the sheet material 22 is advanced to the interior opening shearing stage 38, the breakthrough openings 30 are positioned so that each opening 30 is aligned with one of the apex or points 48 that correspond to the leading terminal ends 48 of all of the shearing edges 46. Then, the shearing tool 40 is advanced toward the shearing die 42, causing the leading terminal ends 48 of all four shearing edges 46 to move into the breakthrough openings 30 so that each shearing edge 46 first engages the ultra-high strength material sheet 22 away from the leading terminal ends 48 thereof. As indicated by the unnumbered arrow in FIG. 1, by advancing the two surfaces 44 to simultaneously shear in opposite directions from the shear initiation breakthrough openings 30, the lateral forces are balanced. Thus, the interior opening 54 is formed.

Because the interior opening shearing tool 40 does not have to perform the initial breakthrough of the ultra-high strength material sheet 22, the peak force required for the interior opening shearing operation is greatly reduced. Because the shearing begins away from the leading terminal end 48 of each shearing edge 46, the premature failure of the tool 40 at the leading terminal edge is also avoided.

The machine 24 also includes a blanking stage 56 in which the ultra-high strength material sheet 22 is cut into separate panels or blanks 58. This stage 56 includes cooperating shearing tools 66 a pair of angled shear edges 60, which also initially engage one of the side edges 62 of the ultra-high strength material sheet 22 away from their leading terminal ends 64. This is possible because an interior-initiated cut or interior opening 54 is not involved requiring an initial breakthrough operation. Rather, the shearing cuts being made at this stage 56 start at an exterior side edge 62 of the ultra-high strength material sheet 22.

Figure 6:
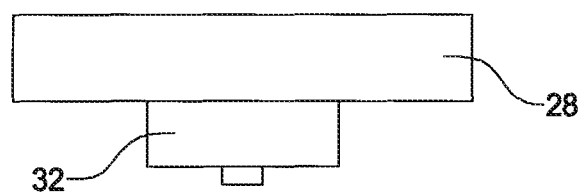
FIG. 6 is a perspective view of an alternative breakthrough initiation opening forming apparatus of the shear initiation breakthrough opening forming stage alternatively used in the machine of FIG. 1.
Figure 7:
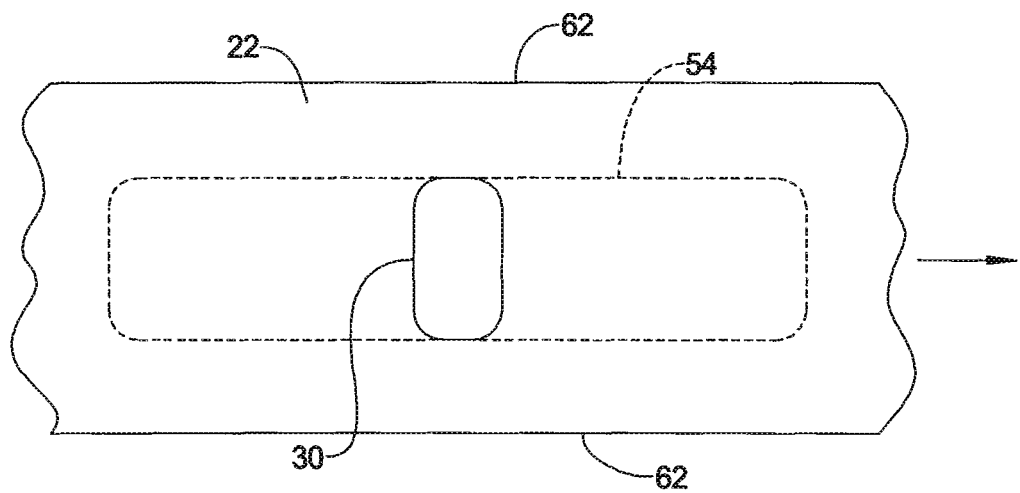
FIG. 7 is a top plan view of a portion of the ultra-high strength material sheet with an alternative single breakthrough opening formed therein, and showing the ultimate interior opening in dotted line.

Referring to FIGS. 6 and 7, the breakthrough opening forming tool 32 provided at the shear initiation breakthrough opening forming stage 28 is any of a laser, waterjet, or plasma cutting tool 32 instead of the previously-described round metal punches. Using such an alternative breakthrough opening forming tool 32, the size and shape of the interior breakthrough opening 30 is not related to any peak breakthrough force because no die force is required to make the interior breakthrough opening 30. In this example, a single interior elongated breakthrough opening 30 extends to encompass not only the leading terminal ends 48 of all of the shearing edges 46, but also to encompass the leading edge 50 or rooftop between the inclined surfaces 44.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A two-stage method of cutting an interior opening in ultra-high strength material sheet comprising:
    forming at least one shear initiation breakthrough opening through the ultra-high strength material sheet at an interior location, each of the at least one shear initiation breakthrough opening formed with a shear initiation breakthrough opening forming tool;
    positioning a leading terminal end of each of at least two inclined shearing edges of an interior opening shearing tool, which is different from the shear initiation breakthrough opening forming tool, in the at least one shear initiation breakthrough opening;
    after positioning, initiating shearing of the material from the at least one shear initiation breakthrough opening by advancing the at least two inclined shearing edges of the interior opening shearing tool against the ultra-high strength material sheet and relative to a corresponding shearing die.

2. The two-stage method of claim 1, further comprising forming at least one other shear initiation breakthrough opening, each of the at least one and at least one other shear initiation breakthrough openings being formed with a round metal punch.

3. The two-stage method of claim 1, wherein forming the at least one shear initiation breakthrough opening comprises forming each of the at least one shear initiation breakthrough opening with a diameter that is between about 5 times and about 10 times the thickness of the ultra-high strength material sheet.

4. The two-stage method of claim 1, wherein the interior opening shearing tool comprises two surfaces inclined relative to each other in a V-shaped configuration and the at least two inclined shearing edges comprise two pairs of inclined shearing edges, each pair of inclined shearing edges being defined by opposite side edges of one of the two surfaces, and wherein the shearing comprises simultaneously advancing the two surfaces to initiate shearing in opposite directions from the at least one shear initiation breakthrough opening.

5. The two-stage method of claim 1, wherein the positioning comprises moving the at least one shear initiation breakthrough opening of the material sheet from a shear initiation breakthrough opening forming stage of a machine in which the forming occurs, to a shearing stage of the machine in which the shearing occurs.

6. The two-stage method of claim 1, wherein the method comprises cutting an ultra-high strength steel sheet.

7. The two-stage method of claim 1, wherein the method comprises cutting an ultra-high strength material sheet having a tensile strength of 800 MPa or greater.

* * * * *